US008375196B2

(12) United States Patent
Björklund et al.

(10) Patent No.: US 8,375,196 B2
(45) Date of Patent: Feb. 12, 2013

(54) VECTOR PROCESSOR WITH VECTOR REGISTER FILE CONFIGURED AS MATRIX OF DATA CELLS EACH SELECTING INPUT FROM GENERATED VECTOR DATA OR DATA FROM OTHER CELL VIA PREDETERMINED REARRANGEMENT PATH

(75) Inventors: Andreas Björklund, Lund (SE); Erik Persson, Lund (SE); Ola Hugosson, Lund (SE)

(73) Assignee: ARM Limited, Cambridge (GB)

( * ) Notice: Subject to any disclaimer, the term of this patent is extended or adjusted under 35 U.S.C. 154(b) by 461 days.

(21) Appl. No.: 12/656,156

(22) Filed: Jan. 19, 2010

(65) Prior Publication Data

US 2010/0313060 A1 Dec. 9, 2010

(30) Foreign Application Priority Data

Jun. 5, 2009 (GB) .................................. 0909730.4

(51) Int. Cl.
*G06F 17/16* (2006.01)
(52) U.S. Cl. ................................. 712/4; 712/7
(58) Field of Classification Search .................. None
See application file for complete search history.

(56) References Cited

U.S. PATENT DOCUMENTS

| 5,086,498 | A | 2/1992 | Tanaka et al. |
| 5,327,537 | A | 7/1994 | Corcoran et al. |
| 5,887,183 | A | 3/1999 | Agarwal et al. |
| 6,963,341 | B1 | 11/2005 | Mimar |
| 2002/0032710 | A1 | 3/2002 | Saulsbury et al. |
| 2003/0088600 | A1 | 5/2003 | Lao et al. |
| 2009/0119479 | A1* | 5/2009 | Kleihorst et al. ............... 712/10 |

FOREIGN PATENT DOCUMENTS

| GB | 2 394 571 | 4/2004 |
| WO | WO 2008/042700 | 4/2008 |

OTHER PUBLICATIONS

International Search Report and Written Opinion of the International Searching Authority dated Sep. 20, 2010 for PCT/GB2010/001074.
UK Search Report dated Sep. 14, 2009 for GB 0909730.4.

* cited by examiner

*Primary Examiner* — Kenneth Kim
(74) *Attorney, Agent, or Firm* — Nixon & Vanderhye P.C.

(57) ABSTRACT

A data processing apparatus includes a vector register bank having a plurality of vector registers, each register including a plurality of storage cells, each cell storing a data element. A vector processing unit is provided for executing a sequence of vector instructions. The processing unit is arranged to issue a set rearrangement enable signal to the vector register bank. The write interface of the vector register bank is modified to provide not only a first input for receiving the data elements generated by the vector processing unit during normal execution, but also has a second input coupled via a data rearrangement path to the matrix of storage cells via which the data elements currently stored in the matrix of storage cells are provided to the write interface in a rearranged form representing the arrangement of data elements that would be obtained by performance of the predetermined rearrangement operation.

15 Claims, 10 Drawing Sheets

VMUL    V0,V1,V2
VTRANS  V0-V7
VADD    V9,V3,V10

|         | DECODE | EXECUTE | DM              | WB              |
|---------|--------|---------|-----------------|-----------------|
| CYCLE 1 | VMUL   |         |                 |                 |
| CYCLE 2 | VTRANS | VMUL    |                 |                 |
| CYCLE 3 | VTRANS |         | VMUL            |                 |
| CYCLE 4 | VTRANS |         |                 | VMUL            |
| CYCLE 5 | VADD   | VTRANS  |                 |                 |
| CYCLE 6 | VADD   |         | VTRANS (NoP)    |                 |
| CYCLE 7 |        | VADD    |                 | VTRANS (NoP)    |

FIG. 10

VECTOR PROCESSOR WITH VECTOR
REGISTER FILE CONFIGURED AS MATRIX
OF DATA CELLS EACH SELECTING INPUT
FROM GENERATED VECTOR DATA OR
DATA FROM OTHER CELL VIA
PREDETERMINED REARRANGEMENT
PATH

This application claims priority to United Kingdom Application No. 0909730.4 filed 5 Jun. 2009, the entire contents of which is hereby incorporated by reference.

BACKGROUND OF THE INVENTION

1. Field of the Invention

The present invention relates to a data processing apparatus and method for performing a predetermined rearrangement operation.

2. Description of the Prior Art

Vector processing units are used in many data processing systems to allow processing operations to be performed in parallel on multiple data elements. The vector processing unit can be viewed as providing a plurality of lanes of parallel processing, with typically the same operation being performed within each lane when executing a particular vector instruction. Vectors of input data elements are provided to the vector processing unit, where typically an input vector provides a data element for each of the lanes of parallel processing.

It is common for a vector register bank to be used to hold the vectors of data elements required by the vector processing unit when executing vector instructions. A vector register bank will typically comprise a plurality of vector registers, where each vector register comprises a plurality of storage cells, with each storage cell storing one of the data elements in the vector.

There are many situations in vector processing where a particular operation needs to be applied to a matrix of data elements, also referred to herein as an array of data elements. Within a vector register bank, such a matrix can be constructed by accessing the contents of multiple vector registers, since as each vector register comprises multiple storage cells, such a plurality of vector registers will provide a matrix of storage cells, with each storage cell storing an individual data element.

Many of the operations that need to be applied to a matrix of data elements comprise rearrangement operations where the data elements themselves do not change, but they are moved to different locations within the matrix. For example, mirror operations may be used to flip the locations of the data elements within the matrix about a horizontal or vertical axis, transpose operations may be used to flip the locations of the data elements within the matrix about a diagonal axis, and various other complex rearrangement operations may also be performed.

The performance of such rearrangement operations within the vector processing unit often requires significant internal storage to be provided within the vector processing unit, and takes many clock cycles since typically the required rearrangement steps need to be performed multiple times on different data elements within the matrix. The problem is particularly acute when performing rearrangement operations that cause rearrangement of the data elements between one or more of the rows and one or more of the columns of the matrix. A transpose operation is a common example of such a rearrangement operation. By way of example, it will be appreciated that if the matrix is an 8×8 matrix, and individual vector registers store 8 data elements, then the contents of 8 vector registers need to be accessed and buffered within the vector processing unit before any result data representing the output of the rearrangement operation can be written back into the vector registers. For example, if we consider the 8 vector registers defining the matrix to be registers v0 to v7, then if a transpose operation is applied to that matrix of data elements it will be appreciated that the result data that needs to be written into the vector register v0 requires a data element from each of the vector registers v0 to v7. This is also true for all of the other registers v1 to v7.

Accordingly, when performing such rearrangement operations it is typically the case that all of the data elements in the matrix need to be read into the vector processing unit, a series of rearrangement steps needs to be performed on that data as buffered locally within the vector processing unit, and then the output data needs to be written back to the vector registers. It is typically the case that a vector register bank provides only a single write port, and accordingly it will be appreciated that with the example of an 8×8 matrix as discussed above, it will additionally take 8 clock cycles to write the results back into the register bank.

The time taken to perform such rearrangement operations has a significant performance impact in many vector processing systems, since it is common for such rearrangement operations to be performed frequently. For example, in the field of video processing, Fourier transform operations are performed frequently, and hence this requires the frequent performance of transform operations.

To seek to reduce this time penalty, it is known to increase the complexity of the register bank by allowing the registers to be accessed in two orthogonal directions. In particular, a register bank can be considered as comprising a plurality of rows of vector registers, and typically one or more read ports are provided for reading the contents of those horizontal registers, and one or more write ports are provided for storing data into those horizontal registers. In the above modified register banks, registers are also defined in the vertical direction, and separate read and write ports are added to allow data to be read from one or more vertically defined registers and written to those vertically defined registers.

Whilst such an approach does allow many rearrangement operations to be performed more quickly, it adds significant cost and complexity to the access control logic of the register bank, and also increases complexity within the vector processing unit due to the need to keep track of data elements that are shared by both a horizontal register and a vertical register.

Where both horizontal and vertical registers are defined within the register bank, it would be possible, for certain rearrangement operations, to perform those rearrangements implicitly by altering the way in which the registers were viewed by the software. For example, an implicit transpose operation might be performed by causing an arithmetic instruction that is intended to operate on "post-transpose" data to access the register bank vertically instead of performing the more usual horizontal access. However this would introduce significant complexities into the code and typically would significantly increase the code size. In addition, it still requires the use of a complex register bank with costly access control circuitry to support both the horizontal and vertical access to the storage cells within the register bank.

US 2003/0088600 provides a software program for transposing a matrix in a computer system. In accordance with the technique described, the matrix is partitioned into a plurality of columns, and then for each column data elements within the column are sequentially read row-wise and then sequentially written into a cache. Thereafter, the elements are sequentially read from the cache and written row-wise back into the matrix in the memory in a particular column, whereafter a permutation vector is applied. The approach described aims to reduce the number of permutation vectors required to perform a transpose of a matrix in order to allow for better parallel processing of transpose operations. However, in order to implement this software based approach within a processor, the transformation will require a larger number of clock cycles to be performed. This in turn requires much processing power, time, and/or current consumption.

It would be desirable to provide a more efficient mechanism for performing rearrangement operations.

SUMMARY OF THE INVENTION

Viewed from a first aspect, the present invention provides a data processing apparatus comprising: a vector register bank comprising a plurality of vector registers, each vector register comprising a plurality of storage cells such that said plurality of vector registers provide a matrix of storage cells, each storage cell arranged to store a data element; a vector processing unit for executing a sequence of vector instructions and having access to the vector register bank in order to read data elements from, and write data elements to, vector registers of the vector register bank during execution of said sequence of vector instructions; responsive to a vector matrix rearrangement instruction specifying a predetermined rearrangement operation to be performed on the data elements in said matrix of storage cells, the vector processing unit being arranged to issue a set rearrangement enable signal to the vector register bank; the vector register bank having a write interface for writing data elements into the vector registers of the vector register bank, the write interface having a first input for receiving data elements generated by the vector processing unit during execution of said sequence of vector instructions, and having a second input coupled via a data rearrangement path to the matrix of storage cells via which the data elements currently stored in the matrix of storage cells are provided to the write interface in a rearranged form representing the arrangement of data elements that would be obtained by performance of said predetermined rearrangement operation; and when the rearrangement enable signal is set by the vector processing unit, the write interface being arranged to perform a write operation to the storage cells of said matrix using the data elements received at the second input.

The inventors of the present invention realised that there is often a particular rearrangement operation that is performed very frequently within a vector processing system and that that rearrangement operation is applied to the same sized matrix each time. The inventors realised that if a quick and efficient mechanism could be provided for performing that predetermined rearrangement operation, this would significantly improve the performance of the vector processing system even if there were still other rearrangement operations that might need to be performed using the standard mechanisms.

In accordance with the present invention, the write interface of the vector register bank is modified so that in addition to having a first input for receiving the data elements generated by the vector processing unit during execution of a sequence of vector instructions, that write interface also has a second input that is coupled via a data rearrangement path to the matrix of storage cells provided by a plurality of registers within the register bank. The matrix of storage cells may be formed by all of the registers in the register bank, or by only a subset of the registers. For example, in one embodiment, 16 vector registers may be provided within the vector register bank, each vector register storing 8 data elements, and an 8×8 matrix of storage cells may be formed from 8 of those 16 vector registers.

Via the rearrangement path, the data elements currently stored in the matrix of storage cells are provided to the second input of the write interface in a rearranged form representing the arrangement of data elements that would be obtained by performance of the predetermined rearrangement operation. The rearrangement path hence provides a fixed re-ordering of the data elements providing the necessary mapping between each of the data elements in order to implement the predetermined rearrangement operation.

Then, when a vector matrix rearrangement instruction specifying that predetermined rearrangement operation is to be executed by the vector processing unit, the vector processing unit does not attempt to perform that rearrangement operation itself, but instead issues a set rearrangement enable signal to the vector register bank. When the rearrangement enable signal is set by the vector processing unit, the write interface is arranged to perform a write operation to the storage cells of the matrix using the data elements received at the second input. As a result all of the data elements within the matrix are rearranged simultaneously within the register bank itself. The predetermined rearrangement operation can thus be performed simply at high speed.

The implementation of the rearrangement path, and the modifications required to the write interface, have been found to be significantly less complex than seeking to support both horizontal and vertical access to the registers in accordance with the earlier-mentioned prior art techniques. Further, since the vector processing unit itself is not required to perform the predetermined rearrangement operation, the complexities within the vector processing unit are significantly reduced. Accordingly, the above approach has been found to provide not only performance improvements but also a reduction in cost and complexity of the vector processing system.

The write interface may be arranged in a variety of ways. However, in one embodiment, the write interface comprises, for each storage cell in said matrix, multiplexer circuitry having a first input for receiving a data element generated by the vector processing unit for storage in the associated storage cell, and a second input for receiving via the data rearrangement path a data element currently stored in one of the storage cells of the matrix, said data element received via the data rearrangement path being the data element that needs to be stored in said associated storage cell to represent the outcome of said predetermined rearrangement operation. Hence, in such embodiments, an array of multiplexers are provided within the write interface to enable the second input to be selectively chosen when the rearrangement enable signal is set, but otherwise for the first input to be used thereby allowing the write interface to perform its normal operation in the absence of a set rearrangement enable signal.

In one embodiment, the write interface further comprises control circuitry for controlling the selection of said first input or said second input dependent on the value of said rearrangement enable signal from the vector processing unit.

In one embodiment, the data processing apparatus further comprises: clock gating circuitry for producing a gated clock signal for each storage cell, the gated clock signal being set by the clock gating circuitry to cause the storage cell receiving that set gated clock signal to store a data element supplied to that storage cell from the write interface; the control circuitry being arranged to set a write enable signal issued to the clock gating circuitry in the event that the rearrangement enable signal is set, to thereby cause the clock gating circuitry to set the gated clock signal issued to each storage cell in said matrix. The use of a gated clock signal provides a particularly power efficient implementation.

The predetermined rearrangement operation can take a variety of forms. However, in one embodiment, said matrix of storage cells comprise a plurality of rows of storage cells and a plurality of columns of storage cells, and said predetermined rearrangement operation causes a rearrangement of the data elements between one or more of said rows and one or more of said columns. The use of the present invention in association with such a predetermined rearrangement operation is particularly beneficial, since such rearrangement operations are the ones that are the most complex and time consuming to perform using the known prior art techniques.

In one embodiment the predetermined rearrangement operation comprises one of: a transpose operation; a rotation operation; a skew diagonal transpose; or a zig-zag scan order transformation. Considering an n×n matrix, a transpose operation causes a flip of the data elements about a diagonal axis extending from cell 0,0 to cell n−1,n−1. A skew diagonal transpose involves a transpose about the orthogonal diagonal axis, namely that axis extending from cell 0,n−1 to cell n−1,0. It will be appreciated that rotation operations can take a variety of forms but will involve a rearrangement of data elements between one or more rows and one or more columns. Similarly, a zig-zag scan order transformation can take a variety of forms, but again involves a rearrangement of the data elements between one or more rows and one or more columns. One particular implementation of such a zig-zag scan order transformation is in JPEG image compression.

In one particular embodiment, said predetermined rearrangement operation is a transpose operation whereby: at least for each storage cell j of vector register i where j≠i, the associated multiplexer circuitry receives at said second input the data element currently stored in storage cell i of vector register j; whereby when said rearrangement enable signal is set, then simultaneously, for at least every storage cell in the matrix where j≠i, the data element currently stored in storage cell i of vector register j is written into the storage cell j of vector register i.

The data processing apparatus may form a dedicated vector processor, arranged solely to execute a sequence of vector instructions. Often such a dedicated vector processor may be coupled with a host processor within the system, and be arranged to perform vector operations on behalf of that host processor. In such embodiments, the vector processor can be viewed as a coprocessor performing vector operations on behalf of the host processor.

However, in an alternative embodiment, the vector processing unit may form a vector processing branch within a processor that also supports scalar operations in one or more different branches. Hence, in such embodiments, the data processing apparatus may further comprise a scalar processing unit and a scalar register bank associated with the scalar processing unit. In one embodiment, the scalar processing unit and vector processing unit may have separate instruction fetch and instruction decoding units, but in an alternative embodiment the instruction fetch and instruction decoding units are shared between the scalar processing unit and the vector processing unit.

The vector processing unit can take a variety of forms, but in one embodiment the vector processing unit is a pipelined processing unit allowing multiple vector instructions to be in the process of execution at any one time.

In situations where the vector processing unit is a pipelined processing unit, then the timing of instructions either side of the vector matrix rearrangement instruction need to be handled carefully to ensure that those instructions use the correct operand data, and to ensure that the rearrangement is not performed until any instructions already in execution ahead of the vector matrix rearrangement instruction have completed, if there is a possibility that those instructions might write to the registers forming the matrix of storage cells.

In particular, in one embodiment, if a vector instruction following the vector matrix rearrangement instruction can potentially operate upon data elements stored in said matrix of storage cells, then pipelined execution of that following vector instruction is arranged to be delayed by at least one clock cycle to allow the write interface to complete the write operation to the storage cells of said matrix using the data received at the second input before that following vector instruction is executed.

In one particular embodiment, the actual input operands for that following instruction can be analysed, and if they do not require access to any of the vector registers forming the matrix of storage cells, then that following instruction can be allowed to proceed. However, in an alternative embodiment, it can be decided not to perform such an analysis, and just to assume that any following instruction should be stalled. This removes the complexity of performing the analysis to determine whether the following instruction needs to use any of the registers the subject of the matrix rearrangement, but at a slight timing penalty since all instructions will be delayed rather than just those that need to read from the registers being subjected to the matrix rearrangement. However, in many embodiments the following instruction is highly likely to want to read from those registers, and in such embodiments merely delaying any vector instruction immediately following the vector matrix rearrangement instruction may be the most appropriate course of action.

In an alternative embodiment, when the rearrangement enable signal is set, the data elements output by the write interface to the matrix of storage cells are additionally provided over a forwarding path to the vector processing unit, thereby enabling a vector instruction following the vector matrix rearrangement instruction that can potentially operate upon data elements stored in said matrix of storage cells to be executed after the vector matrix rearrangement instruction without introducing a delay. By providing such a forwarding path, the above mentioned timing issue is avoided, and instead the following vector instruction can merely be allowed to proceed down the vector pipeline without insertion of any delay.

In one embodiment, the vector processing unit is arranged to delay execution of the vector matrix rearrangement instruction until any instructions already being executed within the pipelined processing unit that could write to the matrix of storage cells in the vector register bank have completed their execution. In one particular embodiment, the vector processing unit may decide to wait until all instructions ahead in the pipeline have been completed before allowing the vector matrix rearrangement instruction to be executed, irrespective of the destination registers for the output of those instructions.

Whilst in one embodiment, a single predetermined rearrangement operation is supported by a data rearrangement path and modified write interface, in alternative embodiments further predetermined rearrangements could also be supported. In particular, in one embodiment, one or more further vector matrix rearrangement instructions are provided, each specifying a further predetermined rearrangement operation. The write interface has a further input for each said further vector matrix rearrangement instruction, each further input being coupled via a further data rearrangement path to the matrix of storage cells via which the data elements currently stored in the matrix of storage cells are provided to the write interface in a rearranged form representing the arrangement of data elements that would be obtained by performance of the associated further predetermined rearrangement operation. Responsive to the vector matrix rearrangement instruction or any of said one or more further vector matrix rearrangement instructions, the vector processing unit being arranged to issue a set rearrangement enable signal to the vector register bank, with the value of the set rearrangement enable signal identifying which predetermined rearrangement operation is required.

Hence, in such embodiments, multiple data rearrangement paths are provided and the write interface includes a corresponding proliferation in the number of inputs. The form of the set rearrangement enable signal is then used to identify which of the various predetermined rearrangement operations is required, with the write interface selecting the appropriate input to provide the data elements to be stored in the storage cells of the matrix. Obviously, as the number of predetermined rearrangement operations supported increases, the size and complexity of the vector register bank increases, and accordingly there will be a cost-performance trade-off to be analysed when deciding how many rearrangement operations to support.

Viewed from a second aspect, the present invention provides a method of performing a predetermined rearrangement operation within a data processing apparatus, the data processing apparatus comprising a vector register bank comprising a plurality of vector registers, each vector register comprising a plurality of storage cells such that said plurality of vector registers provide a matrix of storage cells, each storage cell arranged to store a data element, and further comprising a vector processing unit for executing a sequence of vector instructions and having access to the vector register bank in order to read data elements from, and write data elements to, vector registers of the vector register bank during execution of said sequence of vector instructions, the method comprising the steps of: responsive to a vector matrix rearrangement instruction specifying the predetermined rearrangement operation to be performed on the data elements in said matrix of storage cells, issuing a set rearrangement enable signal to the vector register bank; providing a write interface for writing data elements into the vector registers of the vector register bank, the write interface having first and second inputs; receiving at the first input data elements generated by the vector processing unit during execution of said sequence of vector instructions; coupling the second input via a data rearrangement path to the matrix of storage cells via which the data elements currently stored in the matrix of storage cells are provided to the write interface in a rearranged form representing the arrangement of data elements that would be obtained by performance of said predetermined rearrangement operation; and when the rearrangement enable signal is set, causing the write interface to perform a write operation to the storage cells of said matrix using the data received at the second input.

Viewed from a third aspect, the present invention provides a computer program product comprising computer readable instructions which when executed on a computer cause the computer to implement a method of performing a predetermined rearrangement operation in accordance with the second aspect of the present invention.

Viewed from a fourth aspect, the present invention provides a data processing apparatus comprising: vector register bank means comprising a plurality of vector register means, each vector register means comprising a plurality of storage cell means such that said plurality of vector register means provide a matrix of storage cell means, each storage cell means for storing a data element; vector processing means for executing a sequence of vector instructions and for having access to the vector register bank means in order to read data elements from, and write data elements to, vector register means of the vector register bank means during execution of said sequence of vector instructions; the vector processing means for issuing a set rearrangement enable signal to the vector register bank means, in response to a vector matrix rearrangement instruction specifying a predetermined rearrangement operation to be performed on the data elements in said matrix of storage cell means; the vector register bank means having a write interface means for writing data elements into the vector register means of the vector register bank means, the write interface means having a first input for receiving data elements generated by the vector processing means during execution of said sequence of vector instructions, and having a second input coupled via a data rearrangement path means to the matrix of storage cell means via which the data elements currently stored in the matrix of storage cell means are provided to the write interface means in a rearranged form representing the arrangement of data elements that would be obtained by performance of said predetermined rearrangement operation; and when the rearrangement enable signal is set by the vector processing means, the write interface for performing a write operation to the storage cell means of said matrix using the data received at the second input.

BRIEF DESCRIPTION OF THE DRAWINGS

The present invention will be described further, by way of example only, with reference to embodiments thereof as illustrated in the accompanying drawings, in which:

FIG. 10 illustrates the progress of a sequence of instructions through the vector processing pipeline in accordance with one embodiment.

DESCRIPTION OF EMBODIMENTS

Figure 1:
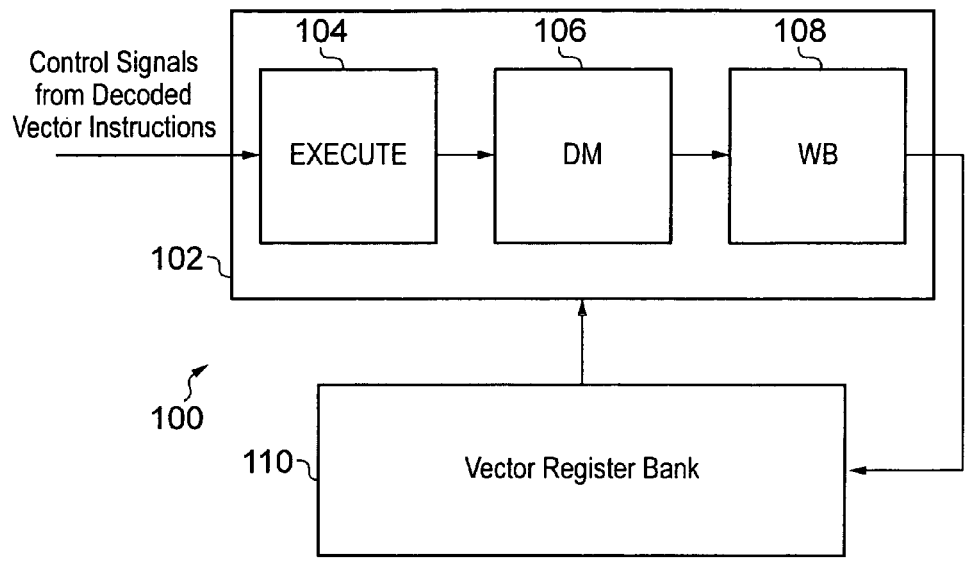
FIG. 1 schematically illustrates at least a part of a processor according to an embodiment.
Figure 3:
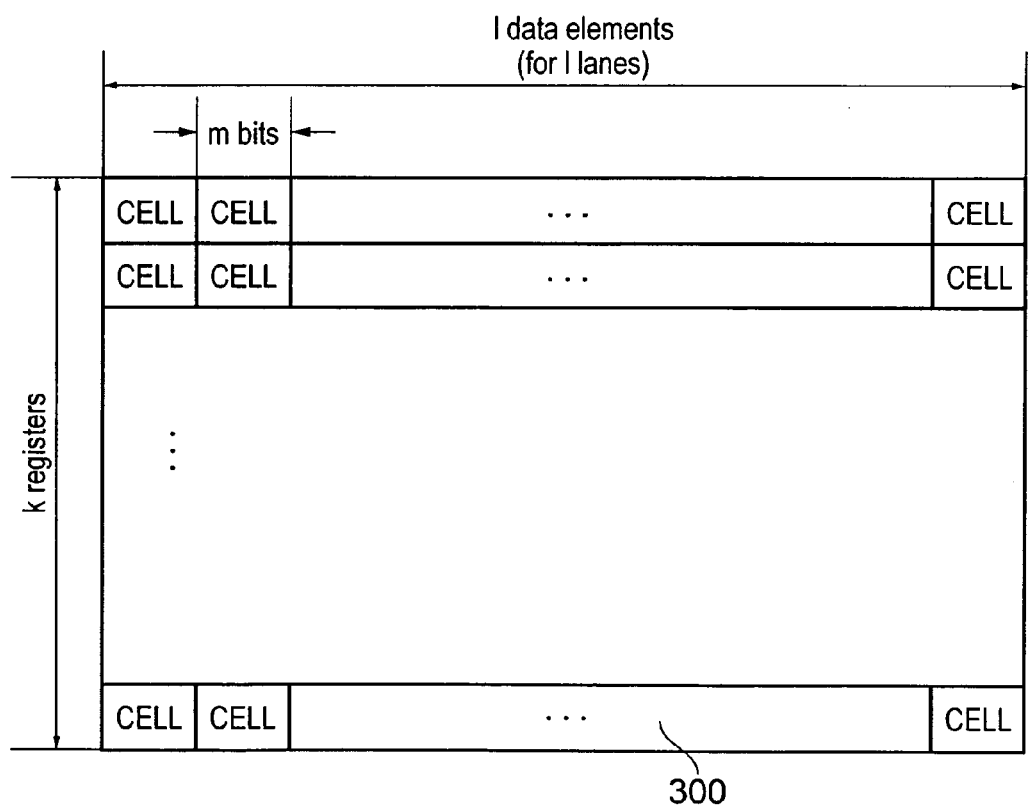
FIG. 3 schematically illustrates a vector register bank according to an embodiment.

FIG. 1 schematically illustrates at least a part of a processor 100 according to an embodiment. The processor 100 comprises a dedicated vector processing unit (also referred to herein as a vector execution unit) 102 to which the control signals from decoded vector instructions are fed. The processor 100 is preferably a pipelined processor, where the dedicated vector execution unit 102 can comprise stages for arithmetic logical operations 104, data memory access 106, and register write back 108. Associated with the dedicated vector execution unit 102, there is provided a vector register bank 110 comprising a first number k of vector registers each comprising a second number l of data elements where each data element has a third number m of bits, for example as illustrated in FIG. 3. The vector processing unit comprises a plurality of lanes of parallel processing, and in one embodiment, when executing a vector instruction specifying one or more input vector registers, each lane receives one of the data elements from each specified input vector register. Hence, in this embodiment each of the vector registers can be seen to store the data elements for l lanes of parallel processing, as illustrated schematically in FIG. 3.

Upon reception of the control signals from decoded vector instructions, the dedicated vector execution unit 102 reads necessary values from the register bank 110, and when the decoded vector instruction is executed through the pipeline, the write back stage feeds any new register values to the register bank for writing. In some embodiments forwarding paths will also be provided to allow result values from one operation to be fed back directly as inputs to a subsequent operation without the need to re-read those values from the register bank 110.

A plurality of the registers in the register bank can be used to store a matrix of data elements to which at least one predetermined rearrangement operation needs to be applied. In particular, each vector register comprises a plurality of storage cells, each storage cell being used to store a data element, and hence the plurality of vector registers will provide a matrix of storage cells, with each storage cell storing an individual data element of the matrix.

As will be discussed in more detail later, upon reception and execution of a vector matrix rearrangement instruction specifying a predetermined rearrangement operation, the dedicated vector execution branch 102 does not directly seek to perform the required rearrangement operation itself but instead issues one or more control signals to control multiplexer circuitry provided within a write interface of the vector register bank 110 in order to cause the rearrangement operation to be performed directly within the register bank. In particular, the multiplexer circuitry has a first input for receiving data elements generated by the vector processing unit during execution of said sequence of vector instructions, and has a second input coupled via a data rearrangement path to the matrix of storage cells via which the data elements currently stored in the matrix of storage cells are provided to the write interface in a rearranged form representing the arrangement of data elements that would be obtained by performance of said predetermined rearrangement operation. The rearrangement path hence provides a fixed re-ordering of the data elements providing the necessary mapping between each of the data elements in order to implement the predetermined rearrangement operation.

When the vector matrix rearrangement instruction is to be executed by the vector processing unit, the vector processing unit issues a set rearrangement enable signal to the vector register bank. When the rearrangement enable signal is set by the vector processing unit, the write interface is arranged to perform a write operation to the storage cells of the matrix using the data elements received at the second input. As a result all of the data elements within the matrix are rearranged simultaneously within the register bank itself. The predetermined rearrangement operation can thus be performed simply at high speed.

In one particular embodiment the vector matrix rearrangement instruction is a vector transpose instruction specifying a transpose operation. In that embodiment, the multiplexer circuitry provides a multiplexer for each storage cell in the matrix, each multiplexer having a first input for write-back from the dedicated vector execution branch, a second input for receiving the data element currently stored in storage cell i of vector register j, and an output connected for write-back to the storage cell j of vector register i. When the rearrangement enable signal is set each multiplexer selects the second input to be output for writing into its associated storage cell, thereby causing each data element to be written to the required transposed position in the matrix, i.e. the data element currently stored in storage cell i of vector register j is written to the storage cell j of vector register i. This is performed at least for each storage cell j of vector register i where j≠i, as any diagonal positions, i.e. j=i, would not require a change of the data element. Thereby, all the values to be transposed are transposed simultaneously. This is made possible without race hazard by a gated clock, as will be further discussed later with reference to FIG. 5.

The execute stage 104 of the vector processing unit 102 can be arranged to perform a variety of arithmetic logical operations such as AND, OR, XOR, and NOT, shift operations such as LSR, LSL, ASR, and ROT, addition, subtraction, and multiplication operations, and minimum and maximum operations, i.e. finding minimum and maximum values within each lane. In addition to these operations acting independently on each lane, inter lane operations are possible, i.e. operations which swap or copy data between lanes.

Figure 2:
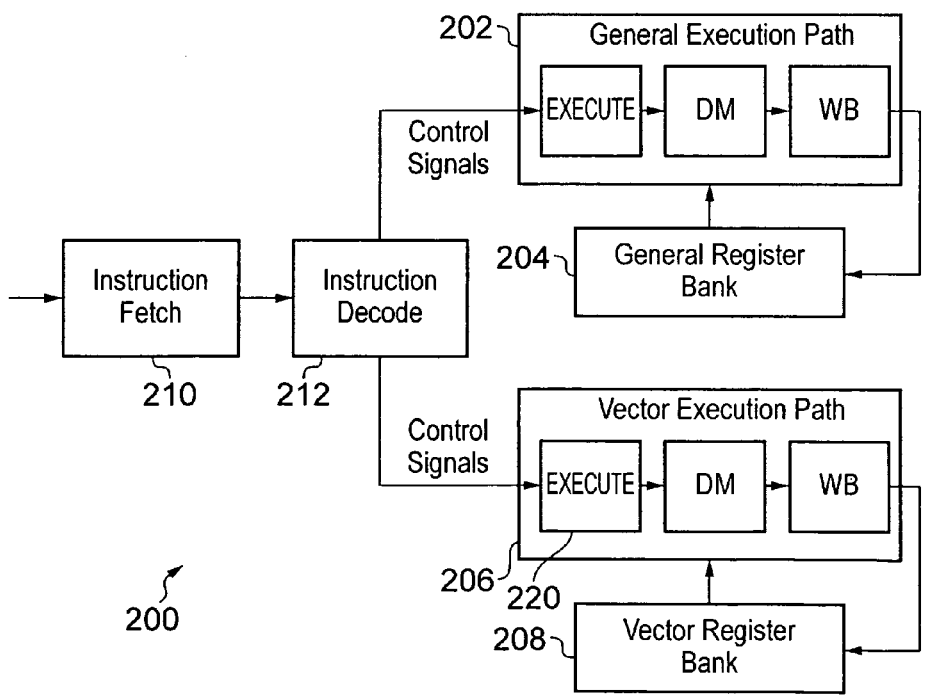
FIG. 2 schematically illustrates a processor according to an embodiment.

FIG. 2 schematically illustrates a processor 200 according to one embodiment. The processor 200 has a general execution unit 202 (also referred to herein as a general execution path) and a general register bank 204 associated with the general execution unit 202. The processor 200 further has a vector execution unit 206 (also referred to herein as a vector execution path) and an associated vector register bank 208, similar to the arrangement demonstrated with reference to FIG. 1. The processor also comprises an instruction fetch and instruction decoding unit being common for the general execution unit 202 and the vector execution unit 206. The instruction fetch and instruction decoding unit in one embodiment comprises an instruction fetch stage 210 arranged to fetch instructions, e.g. by sending a program counter value to a program memory, such as an instruction cache, in order to read the next instruction. The instruction fetch and instruction decoding unit in one embodiment further comprises an instruction decode stage 212 arranged to produce control signals for execution from the instruction bits. The instruction decode stage 212 is also arranged to distinguish between vector instructions and general instructions, where the control signals are provided to the general execution unit 202 in case of a general instruction, and to the vector execution unit 206 in case of a vector instruction. The control signals can be regarded as "decoded instructions".

In case of a vector matrix rearrangement instruction as discussed above, appropriate control signals are provided to the vector execution branch 206 where the transpose instruction is executed in the execute stage 220 so as to cause the rearrangement enable signal to be set and asserted to the register bank. The operation then proceeds through the rest of the vector execution path pipeline 206 as a no operation (NoP), since as discussed earlier the actual rearrangement is performed directly within the vector register bank.

FIG. 3 schematically illustrates a vector register bank 300 according to an embodiment. The vector register bank 300 comprises a first number k of vector registers. Each vector register comprises a second number l of data elements (one for each of l lanes of parallel processing), where each data element is stored in a storage cell and comprises a third number m of bits, i.e. each register comprises l×m bits. According to one embodiment, there are 16 vector registers of 128 bits divided into 8 data elements of 16 bits each, i.e. k=16, l=8, m=16. In one example embodiment, the vector rearrangement operation performed within the register bank may involve 8 of the vector registers and each lane of these 8 vector registers, i.e. is a rearrangement operation on an 8×8 matrix where each matrix element is a 16 bit value. Other values of k,l,m, and other sizes of matrices to be operated on, are of course equally possible.

Figure 4:
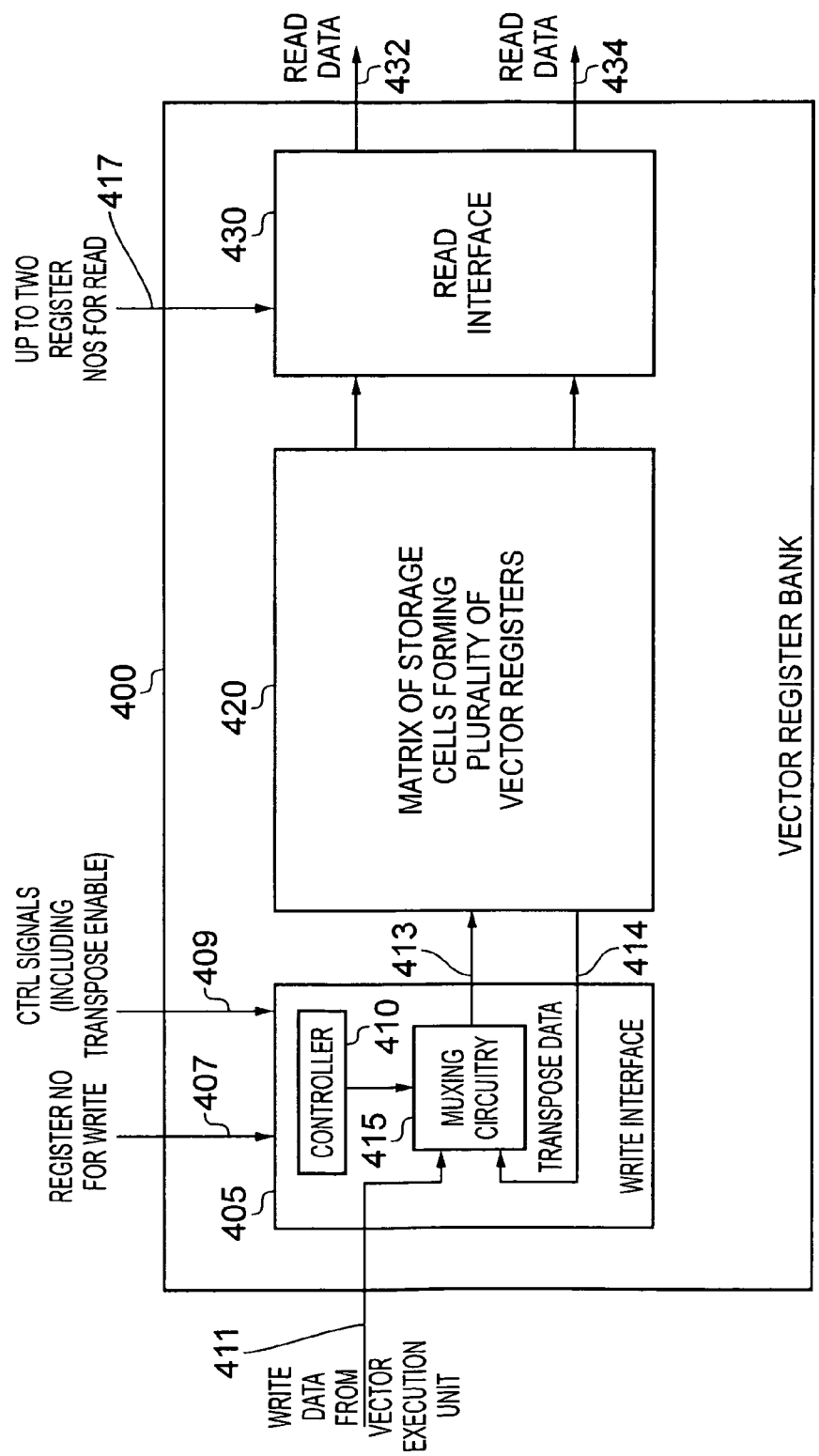
FIG. 4 is a block diagram illustrating in more detail components provided within the vector register bank in accordance with one embodiment.

FIG. 4 is a block diagram illustrating the vector register bank in accordance with one embodiment. The vector register bank comprises a plurality of vector registers 420 that form a matrix of storage cells. In one particular embodiment there are 16 vector registers each having 8 storage cells for storing 8 data elements, and 8 of those vector registers are used to form an 8×8 matrix of storage cells that are subjected to a predetermined rearrangement operation under the control of the vector execution path 206.

Data is written into the vector registers 420 via a write interface 405 and similarly data elements are read from the vector registers via a read interface 430. In the example illustrated, the write interface provides a single write port via which write data from the vector execution unit can be routed over path 411 for storing into a destination vector register within the plurality of vector registers 420. A signal is provided from the vector execution unit 206 over path 407 to identify to the controller 410 which of the vector registers is the destination vector register for the write data provided over path 411. During normal operation the multiplexing circuitry 415 is arranged to output the data received over path 411, so that that data is provided over path 413 to the vector registers 420.

In the embodiment shown, the read interface 430 provides two read ports, such that the contents of two vector registers can be output to the vector execution unit 206 over the paths 432, 434, respectively. An indication of up to two register numbers can be provided from the vector execution unit 206 (or in one embodiment from the instruction decode unit 212) to identify up to two source registers within the plurality of vector registers 420 from which data should be read.

As discussed earlier, on execution of a vector matrix rearrangement instruction, a rearrangement enable signal is set by the execute stage 220 of the vector execution unit 206 and issued to the vector register bank. For the purposes of the following discussion, it will be assumed that the vector matrix rearrangement instruction is a vector transpose instruction specifying a transpose operation to be performed on a matrix of data elements stored within predetermined registers of the register bank, for example vector registers v0 to v7 of the vector register bank. In this event, on execution of the vector transpose instruction, a transpose enable signal will be set and asserted to the vector register bank over path 409, causing the controller 410 to issue a control signal to the multiplexing circuitry 415 to cause the multiplexing circuitry to switch its input to the second input. As a result, the data output for writing into the vector registers over path 413 is transpose data received over the data rearrangement path 414 directly from the plurality of vector registers 420. In particular, via the data rearrangement path 414, the second input of the multiplexing circuitry 415 receives the data elements currently stored in the matrix of storage elements, but provided in a rearranged form representing the arrangement of data elements that would be obtained by performance of the transpose operation. Accordingly, by the above approach, the contents of the storage cells in the matrix are updated simultaneously to reflect the outcome of the transpose operation, thus allowing the transpose operation to be performed simply and at high speed.

Figure 5:
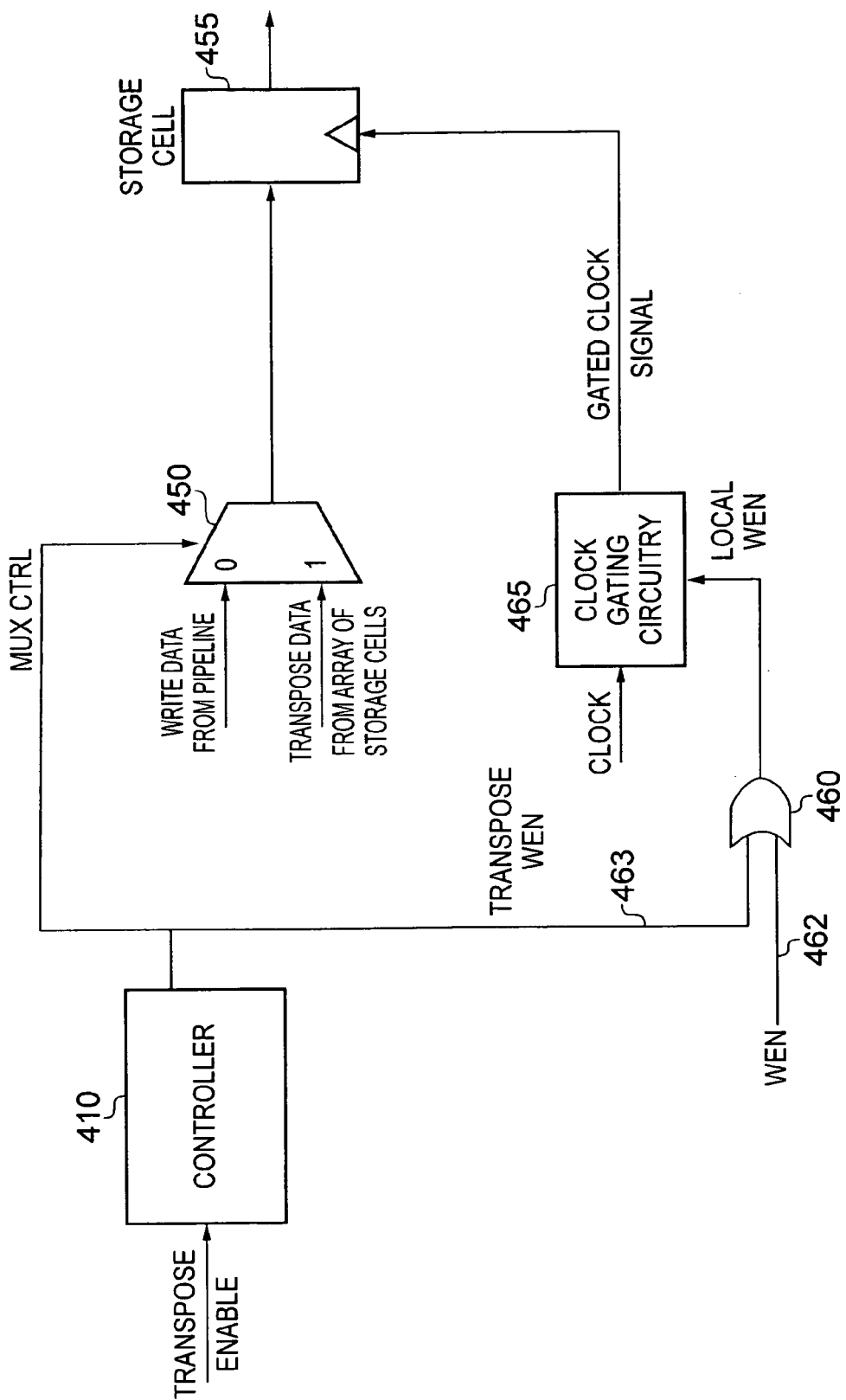
FIG. 5 is a diagram illustrating the use of clock gating circuitry to control the writing of data into the individual storage cells of the matrix of FIG. 4 in accordance with one embodiment.

FIG. 5 illustrates how clock gating circuitry can be used to control the operation of the multiplexing circuitry in order to ensure that all storage cells within the matrix are updated simultaneously. As shown, the controller 410 is responsive to the transpose enable signal to issue a mux control signal to a multiplexer 450 associated with a particular cell 455 in the matrix. In this embodiment, a multiplexer 450 will be provided within the multiplexing circuitry 415 for each storage cell in the matrix of storage cells holding the data elements to be subjected to the transpose operation (the storage cells of vector registers v0 to v7 in the above example), and hence the mux control signal will be issued to each of those multiplexers.

When the transpose enable signal is not set, the mux control signal will be at a logic zero value to cause each multiplexer 450 to select as its output any write data received from the vector pipeline. However, when the transpose enable signal is set, the mux control signal will be set to a logic one value to cause each multiplexer 450 to select the transpose data from the array of storage cells, thereby causing each storage cell 455 to receive the required transpose data for storage therein.

Data values are only written into the storage cell 455 when a gated clock signal is set by the clock gating circuitry 465. The clock gating circuitry 465 receives a regular clock signal, and a local write enable (WEN) signal. Assuming the storage cell 455 is caused to store its input on a rising edge of the clock, then when the local write enable signal is asserted, the clock gating circuitry will cause a rising edge to be asserted in the gated clock signal when the received clock signal has a rising edge, thereby causing the storage cell 455 to latch its current input value.

For normal write operations required as a result of operations being executed within the vector execution path 206, a write enable signal will be received over path 462, and propagated via the OR gate 460 to the clock gating circuitry 465 as a local write enable signal. In addition, when the transpose enable signal is set, the controller 410 will assert a transpose write enable signal over path 463, which will be propagated via the OR gate 460 to cause the local write enable signal to be asserted. As a result, the clock gating circuitry 465 will issue an asserted clock signal causing the storage cell to store therein the data element provided as its input. In one embodiment, each data element is 16 bits in length, and accordingly each storage cell 455 stores a 16-bit data element. However, it will be appreciated that in alternative embodiments the data elements may be of any desired size, and hence for example may be 32-bit data elements.

In one embodiment, the clock gating circuitry 465 may be replicated for each vector register, allowing each vector register to be independently written to. However, in an alternative embodiment, the clock gating circuitry 465 is actually replicated for each storage cell, allowing individual storage cells within vector registers to be written to independently.

Figure 6:
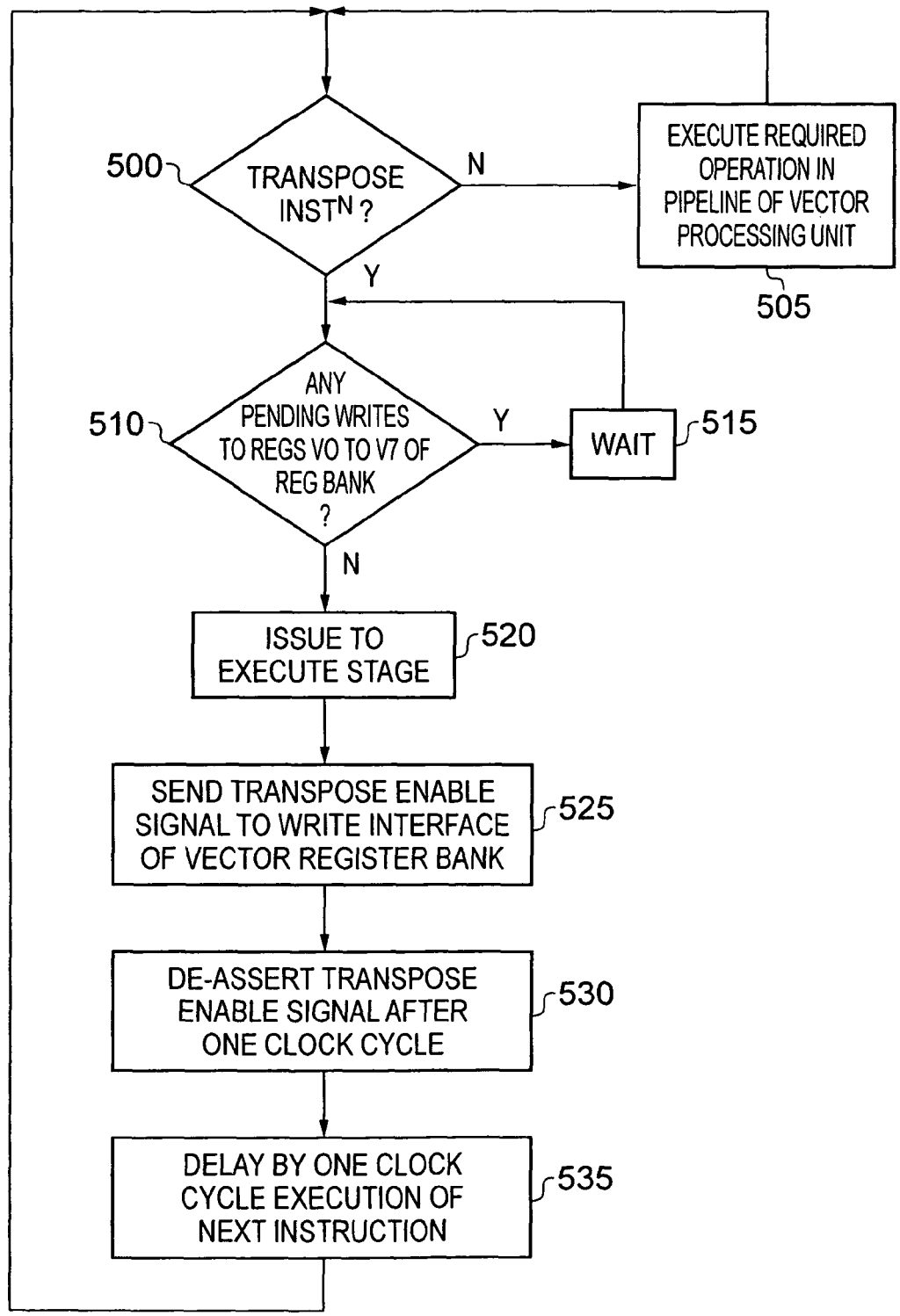
FIG. 6 is a flow diagram illustrating the operation of the vector processing unit in accordance with one embodiment.

FIG. 6 is a flow diagram illustrating the operation of the pipelined vector processing unit 206 in accordance with one embodiment. When an instruction is decoded and the appropriate control signals are routed to the vector processing unit, it is determined at step 500 whether the control signals identify a transpose instruction. If not, then the operation required by the vector instruction is performed in the pipeline of the vector processing unit in the standard manner at step 505, whereafter the process returns to step 500.

However, if it is determined at step 500 that a transpose instruction is to be executed, then the process proceeds to step 510 where it is determined whether any pending writes to the registers of the register bank holding the matrix of data elements to be subjected to the transpose operation are awaiting completion. In the embodiment described herein, it is assumed that vector registers v0 to v7 provide an 8×8 matrix of data elements to be subjected to the transpose operation. Accordingly, in this instance it is checked whether any of the instructions already being executed in the pipeline may need to write to any of the vector registers v0 to v7, and if they do, a delay is introduced at step 515, before rechecking for any pending writes at step 510.

In one embodiment, instead of actually reviewing the destination registers for any instructions already in execution, and only introducing a stall if one or more of those instructions needs to write to vector registers v0 to v7, the vector processing unit may be arranged to introduce a stall whilst any instructions are still being executed in the pipeline. In such an embodiment, the process is only allowed to progress from step 510 to step 520 once all pending instructions have completed execution, and accordingly any pending write operations have been performed, irrespective of the destination registers for the output of those instructions.

Following step 510, the decoded control signals for the transpose instruction are issued to the execute stage 220 of the vector execution pipeline 206. Then, at step 525, the execute stage 220 sends an asserted transpose enable signal to the write interface of the vector register bank, thereby causing the transpose operation to be performed directly within the vector register bank as discussed earlier.

Thereafter, at step 530, the transpose enable signal is de-asserted after one clock cycle. The transpose enable signal only needs to be asserted for one clock cycle, since it is known that the vector register bank will be in a position to perform the required transpose operation immediately on receipt of the set transpose enable signal, due to execution of the transpose instruction having been delayed by steps 510, 515 until all pending writes have been performed.

At step 535, the next instruction to be executed after the transpose instruction is delayed by one cycle. In one embodiment this may be done irrespective of the source registers to be used by that instruction (introducing a blanket delay for the next instruction whatever source registers it is to use). However, in an alternative embodiment, the actual source operands required by that next instruction can be evaluated, and the delay only introduced if that next instruction needs to use as a source operand any of the vector registers involved in the rearrangement operation within the register bank.

In a further alternative embodiment, when the transpose enable signal is set, the data elements output by the write interface 405 to the matrix of storage cells 420 may additionally be provided over a forwarding path to the vector execution unit 206, thereby enabling a vector instruction following the vector transpose instruction to be executed without introducing a delay at step 535, even if that vector instruction may potentially operate upon data elements stored in the matrix of storage cells.

Following step 535, the process returns to step 500.

Figure 7:
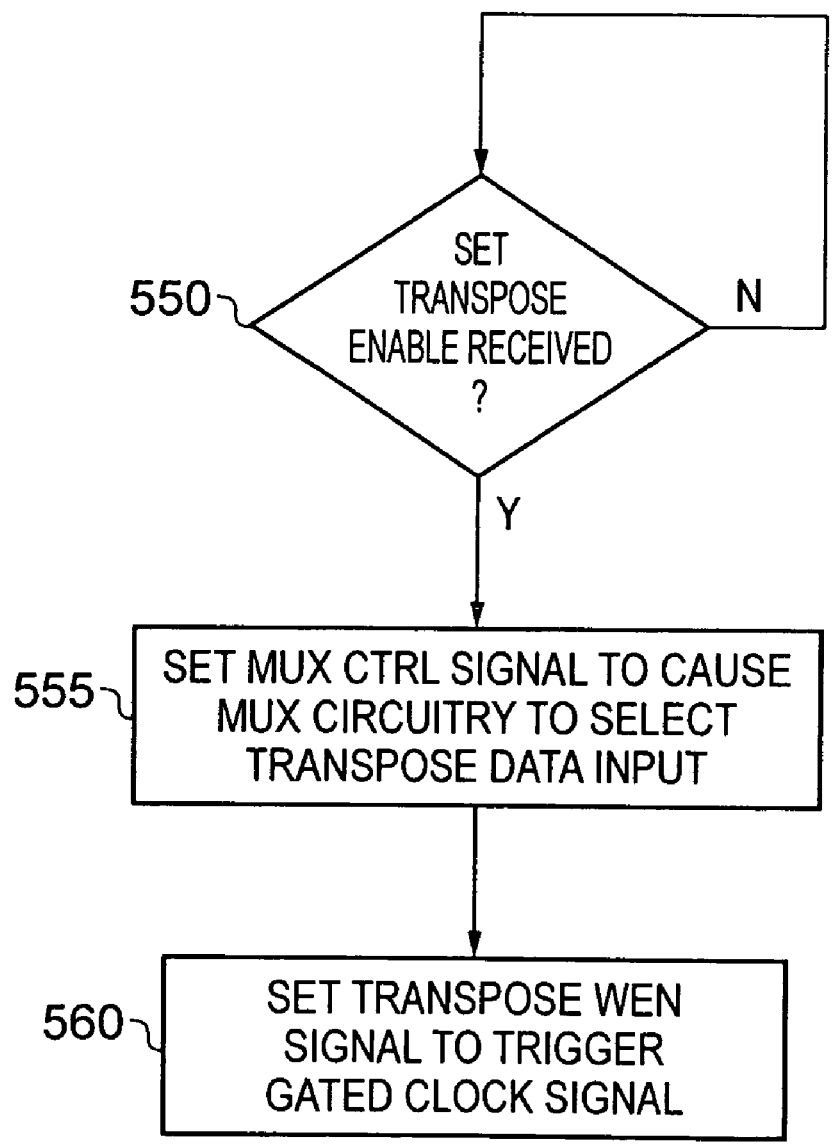
FIG. 7 is a flow diagram illustrating the operation of the vector register bank on receipt of a set transpose enable signal in accordance with one embodiment.

FIG. 7 is a flow diagram illustrating the operation of vector register bank in response to a set transpose enable signal. At step 550, it is determined whether the transpose enable signal has been set, and if it has the process proceeds to step 555 where the mux control signal output by the controller 410 is set to cause the multiplexing circuitry 415 to select the transpose data over path 414 as its input. In addition, the transpose write enable signal is asserted at step 560 to trigger the gated clock signal, to thereby ensure that each of the storage cells in the matrix simultaneously updates its contents using the data elements provided over path 413 from the multiplexing circuitry 415.

The predetermined rearrangement operation that can be performed using the above described techniques can take a variety of forms. As discussed in one embodiment the rearrangement operation may be a transpose operation such as that illustrated schematically in FIG. 8. As can be seen, for each storage cell j of vector register i where j does not equal i, then simultaneously the data element currently stored in storage cell i of vector register j is written into the storage cell j of vector register i. However, no update is required for the storage cells 0,0, 1,1, 2,2, 3,3, 4,4, 5,5, 6,6 or 7,7.

Figure 8:
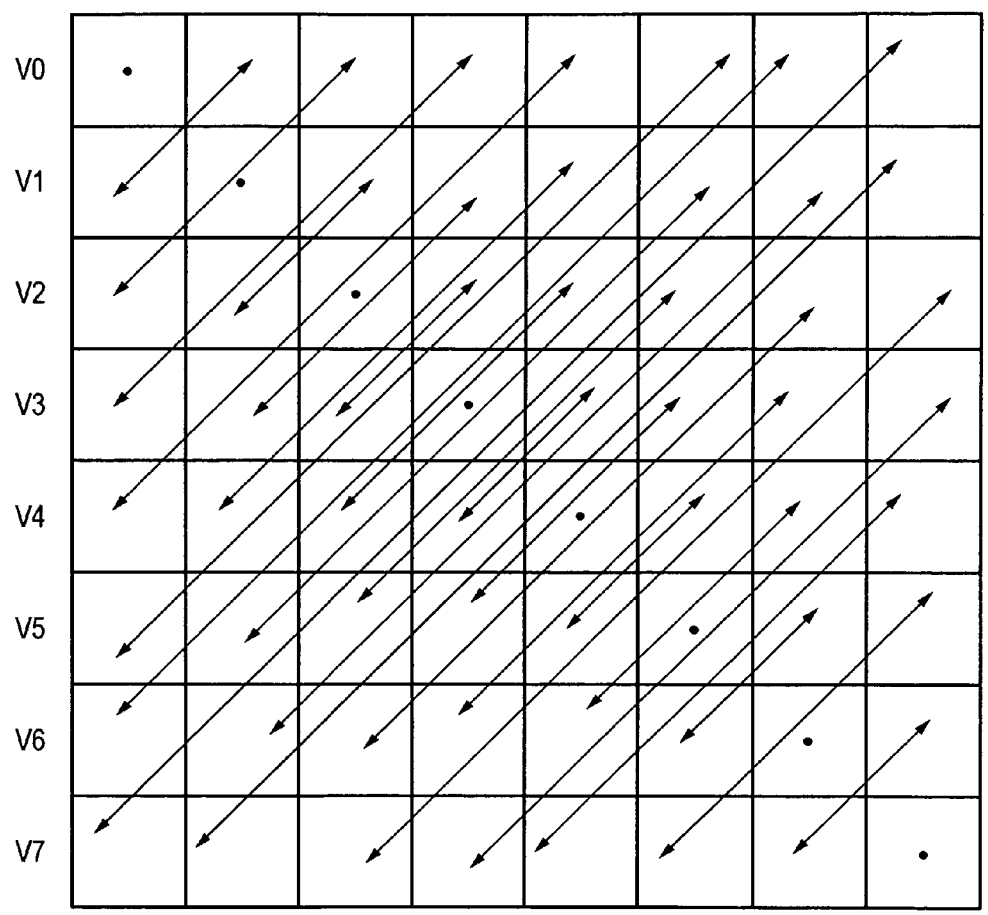
FIG. 8 schematically illustrates the result of a transpose operation performed on a matrix of data elements in accordance with one embodiment.

In an alternative embodiment, a skew diagonal transpose operation can be performed where the transpose occurs about the orthogonal diagonal axis to that illustrated in FIG. 8, namely the axis extending from cell 0,7 to cell 7,0.

Figure 9:
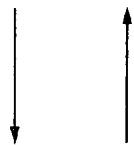
FIG. 9 schematically illustrates the result of a zig-zag scan order transformation operation performed on a matrix of data elements in accordance with one embodiment.

As an alternative to a transpose operation, a rotation operation may be performed, which, like a transpose operation, involves a rearrangement of data elements between one or more rows and one or more columns. In yet a further alternative embodiment, a zig-zag scan order transformation may be performed, such as illustrated schematically in FIG. 9. The numbers 0 to 9 in FIG. 9 illustrate particular data elements, and accordingly the manner in which those data elements are moved by the zig-zag scan order transformation operation can be seen from a comparison of the upper part of FIG. 9 with the lower part of FIG. 9. Such zig-zag scan order transformations are common in JPEG image compression.

FIG. 10 illustrates how a sequence of three instructions may propagate through the vector processing unit in accordance with one embodiment. In this example a vector multiply instruction (VMUL) is followed by a vector transpose instruction (VTRANS), whereafter a vector add instruction (VADD) is performed. The multiply instruction multiplies the contents of vector register v1 and vector register v2, placing the result in vector register v0. The vector transpose operation is performed in respect of the contents of vector registers v0 to v7. In the example illustrated, the vector add instruction adds the contents of vector register v3 to the contents of vector register v10, placing the result in vector register v9.

In the first cycle, the vector multiply instruction is decoded by the instruction decode stage 212. In the next cycle, the control signals produced by the instruction decode stage 212 for the vector multiply instruction are passed to the execute stage 220 of the vector execution path 206, whilst the vector transpose instruction is decoded in the instruction decode stage 212. In the embodiment shown, the vector transpose instruction is not allowed to be executed until the multiply instruction has completed, since the multiply instruction needs to write to the vector register v0, and the vector register v0 is involved in the transpose operation. Accordingly, in cycle 3 the vector multiply instruction proceeds to the DM stage whilst the vector transpose instruction remains in the decode stage, and in cycle 4 the vector multiply instruction proceeds to the write back stage whilst again the vector transpose instruction remains in the decode stage.

However, in cycle 5, the vector transpose instruction can now proceed to the execute stage, allowing the vector add instruction to be passed into the instruction decode stage. At this point, the execute stage 220 of the vector execution path 206 will assert the transpose enable signal causing the vector register bank to perform the required transpose operation directly. The vector transpose instruction then proceeds as a NoP (no operation) through the DM stage in cycle 6 and the write back stage in cycle 7, since no further action is required within the vector execution path 206 itself.

As shown, the vector add instruction is delayed by one cycle due to the fact that it needs as a source operand the contents of vector register v3, and vector register v3 is involved in the transpose operation, and accordingly in cycle 6 the vector add instruction remains in the decode stage, and only moves to the execute stage in cycle 7.

If the vector add instruction did not require as a source operand any of the vector registers v0 to v7, it would be able to proceed into the execute stage during cycle 6 instead of having to wait until cycle 7. Similarly, if as mentioned earlier an embodiment is implemented where forwarding paths are provided from the vector register bank to the vector execute stage via which the transpose data can be directly provided to the execute stage at the time it is written into the matrix of storage cells, then again the vector add instruction will be able to proceed directly into the execute stage at cycle 6, irrespective of the source operands required.

Figure 11:
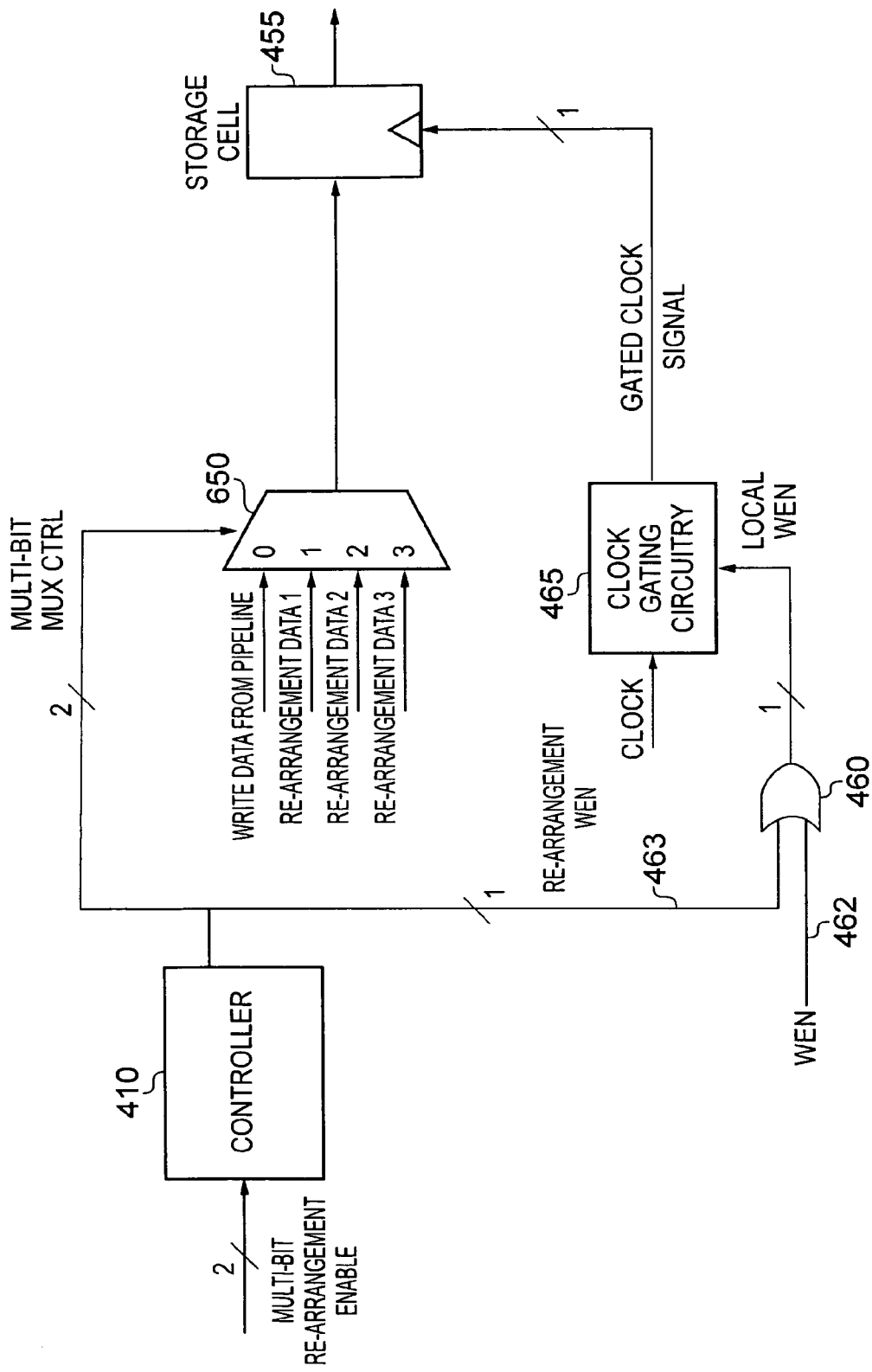
FIG. 11 illustrates how multiplexer circuitry having more than two inputs can allow a selection between multiple predetermined rearrangement operations in accordance with one embodiment.

Whilst in one embodiment, a single predetermined rearrangement operation is supported by a data rearrangement path and modified write interface, in alternative embodiments further predetermined rearrangements can also be supported, as illustrated schematically in FIG. 11. By comparison of FIG. 11 with the earlier-described FIG. 5, it will be seen that the circuitry is largely unchanged. However, the multiplexer 450 associated with each storage cell in FIG. 5 is now replaced by the multiplexer 650 having more than two inputs. In this particular example, four inputs are provided, with the first input providing the write data from the pipeline, and each of the remaining three inputs receiving rearrangement data provided over separate data rearrangement paths from the matrix of storage elements in the register bank.

In this embodiment, a multi-bit rearrangement enable signal is then used to encode which particular rearrangement is required, this being set dependent on the form of the vector matrix rearrangement instruction. In the example where there are four possible inputs to the multiplexer 650, it will be appreciated that a two bit rearrangement enable signal is required. This will cause a corresponding two-bit mux control signal to be issued to the multiplexer 650 to identify which input should be provided to the storage cell 455. The operation of the clock gating circuitry 465 remains unchanged from that discussed earlier with reference to FIG. 5.

In such embodiments, it is then possible for multiple predetermined rearrangement operations to be performed directly within the register bank. As the number of predetermined rearrangement operations supported increases, then it will be clear that the size and complexity of the vector register bank increases due to the increase in the size of each multiplexer 650, and some additional complexity within the controller 410, and accordingly there will be a cost-performance trade-off to be analysed when deciding how many rearrangement operations to support. However, for a small number of rearrangement operations that need to be performed very frequently, such an arrangement may provide significant performance benefits that outweigh any increase in complexity of the register bank.

From the above description of embodiments, it will be appreciated that such embodiments provide a simple and high speed mechanism for performing predetermined rearrangement operations. The implementation of the data rearrangement path, and the modifications required to the write interface, have been found to be significantly less complex than known prior art techniques which seek to improve the performance of rearrangement operations. Further, since the vector processing unit itself is not required to perform the predetermined rearrangement operation, the complexities within the vector processing unit are significantly reduced. Accordingly, the above approach has been found to provide not only performance improvements but also a reduction in cost and complexity of the vector processing system.

Whilst the above described techniques may be performed by hardware executing a sequence of native instructions which include the above-mentioned instructions, it will be appreciated that in alternative embodiments, such instructions may be executed in a virtual machine environment, where the instructions are native to the virtual machine, but the virtual machine is implemented by software executing on hardware having a different native instruction set. The virtual machine environment may provide a full virtual machine environment emulating execution of a full instruction set or may be partial, e.g. only some instructions, including the instructions of the present technique, are trapped by the hardware and emulated by the partial virtual machine.

More specifically, the above-described vector matrix rearrangement instructions may be executed as native instructions to the full or partial virtual machine, with the virtual machine together with its underlying hardware platform operating in combination to provide the vector processing described above.

Although particular embodiments have been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

We claim:

1. A data processing apparatus comprising:
   a vector register bank comprising a plurality of vector registers, each vector register comprising a plurality of storage cells such that said plurality of vector registers provide a matrix of storage cells, each storage cell arranged to store a data element;
   a vector processing unit for executing a sequence of vector instructions and having access, to the vector register bank in order to read data elements from, and write data elements to, vector registers of the vector register bank during execution of said sequence of vector instructions;
   responsive to a vector matrix rearrangement instruction specifying a predetermined rearrangement operation to be performed on the data elements in said matrix of storage cells, the vector processing unit being arranged to issue a set rearrangement enable signal to the vector register bank;
   the vector register bank having a write interface for writing data elements into the vector registers of the vector register bank, the write interface having a first input for receiving data elements generated by the vector processing unit during execution of said sequence of vector instructions, and having a second input coupled via a data rearrangement path to the matrix of storage cells via which the data elements currently stored in the matrix of storage cells are provided to the write interface in a rearranged form representing the arrangement of data elements that would be obtained by performance of said predetermined rearrangement operation; and
   when the rearrangement enable signal is set by the vector processing unit, the write interface being arranged to perform a write operation to the storage cells of said matrix using the data elements received at the second input, wherein said write interface comprises, for each storage cell in said matrix, multiplexer circuitry having a first input for receiving a data element generated by the vector processing unit for storage in the associated storage cell, and a second input for receiving via the data rearrangement path a data element currently stored in one of the storage cells of the matrix, said data element received via the data rearrangement path being the data element that needs to be stored in said associated storage cell to represent the outcome of said predetermined rearrangement operation.

2. A data processing apparatus as claimed in claim 1, wherein:
one or more further vector matrix rearrangement instructions are provided, each specifying a further predetermined rearrangement operation;
the write interface has a further input for each said further vector matrix rearrangement instruction, each further input being coupled via a further data rearrangement path to the matrix of storage cells via which the data elements currently stored in the matrix of storage cells are provided to the write interface in a rearranged form representing the arrangement of data elements that would be obtained by performance of the associated further predetermined rearrangement operation; and
responsive to the vector matrix rearrangement instruction or any of said one or more further vector matrix rearrangement instructions, the vector processing unit being arranged to issue a set rearrangement enable signal to the vector register bank, with the value of the set rearrangement enable signal identifying which predetermined rearrangement operation is required.

3. A data processing apparatus as claimed in claim 1, wherein the write interface comprises control circuitry for controlling the selection of said first input or said second input dependent on the value of said rearrangement enable signal from the vector processing unit.

4. A data processing apparatus as claimed in claim 3, further comprising:
clock gating circuitry for producing a gated clock signal for each storage cell, the gated clock signal being set by the clock gating circuitry to cause the storage cell receiving that set gated clock signal to store a data element supplied to that storage cell from the write interface;
the control circuitry being arranged to set a write enable signal issued to the clock gating circuitry in the event that the rearrangement enable signal is set, to thereby cause the clock gating circuitry to set the gated clock signal issued to each storage cell in said matrix.

5. A data processing apparatus as claimed in claim 1, wherein said matrix of storage cells comprise a plurality of rows of storage cells and a plurality of columns of storage cells, and said predetermined rearrangement operation causes a rearrangement of the data elements between one or more of said rows and one or more of said columns.

6. A data processing apparatus as claimed in claim 5, wherein said predetermined rearrangement operation comprises one of:
a transpose operation;
a rotation operation;
a skew diagonal transpose; or
a zig-zag scan order transformation.

7. A data processing apparatus as claimed in claim 1, wherein:
said predetermined rearrangement operation is a transpose operation whereby:
at least for each storage cell j of vector register i where j≠i, the associated multiplexer circuitry receives at said second input the data element currently stored in storage cell i of vector register j;
whereby when said rearrangement enable signal is set, then simultaneously, for at least every storage cell in the matrix where j≠i, the data element currently stored in storage cell i of vector register j is written into the storage cell j of vector register i.

8. A data processing apparatus as claimed in claim 1, further comprising:
a scalar processing unit;
a scalar register bank associated with the scalar processing unit; and
an instruction fetch and instruction decoding unit shared between said scalar processing unit and said vector processing unit.

9. A data processing apparatus as claimed in claim 1, wherein the vector processing unit is a pipelined processing unit allowing multiple vector instructions to be in the process of execution at any one time.

10. A data processing apparatus as claimed in claim 9, wherein if a vector instruction following the vector matrix rearrangement instruction can potentially operate upon data elements stored in said matrix of storage cells, then pipelined execution of that following vector instruction is arranged to be delayed by at least one clock cycle to allow the write interface to complete the write operation to the storage cells of said matrix using the data received at the second input before that following vector instruction is executed.

11. A data processing apparatus as claimed in claim 9, wherein when the rearrangement signal is set, the data elements output by the write interface to the matrix of storage cells are additionally provided over a forwarding path to the vector processing unit, thereby enabling a vector instruction following the vector matrix rearrangement instruction that can potentially operate upon data elements stored in said matrix of storage cells to be executed after the vector matrix rearrangement instruction without introducing a delay.

12. A data processing apparatus as claimed in claim 9, wherein the vector processing unit is arranged to delay execution of the vector matrix rearrangement instruction until any instructions already being executed within the pipelined processing unit that could write to the matrix of storage cells in the vector register bank have completed their execution.

13. A data processing apparatus comprising:
vector register bank means comprising a plurality of vector register means, each vector register means comprising a plurality of storage cell means such that said plurality of vector register means provide a matrix of storage cell means, each storage cell means for storing a data element;
vector processing means for executing a sequence of vector instructions and for having access to the vector register bank means in order to read data elements from, and write data elements to, vector register means of the vector register bank means during execution of said sequence of vector instructions;
the vector processing means for issuing a set rearrangement enable signal to the vector register bank means, in response to a vector matrix rearrangement instruction specifying a predetermined rearrangement operation to be performed on the data elements in said matrix of storage cell means;

the vector register bank means having a write interface means for writing data elements into the vector register means of the vector register bank means, the write interface means having a first input for receiving data elements generated by the vector processing means during execution of said sequence of vector instructions, and having a second input coupled via a data rearrangement path means to the matrix of storage cell means via which the data elements currently stored in the matrix of storage cell means are provided to the write interface means in a rearranged form representing the arrangement of data elements that would be obtained by performance of said predetermined rearrangement operation; and when the rearrangement enable signal is set by the vector processing means, the write interface for performing a write operation to the storage cell means of said matrix using the data received at the second input, wherein said write interface means comprises, for each storage cell means in said matrix, multiplexer means having a first input for receiving a data element generated by the vector processing means for storage in the associated storage cell means, and a second input for receiving via the data rearrangement path means a data element currently stored in one of the storage cell means of the matrix, said data element received via the data rearrangement path means being the data element that needs to be stored in said associated storage cell means to represent the outcome of said predetermined rearrangement operation.

14. A method of performing a predetermined rearrangement operation within a data processing apparatus, the data processing apparatus comprising a vector register bank comprising a plurality of vector registers, each vector register comprising a plurality of storage cells such that said plurality of vector registers provide a matrix of storage cells, each storage cell arranged to store a data element, and further comprising a vector processing unit for executing a sequence of vector instructions and having access to the vector register bank in order to read data elements from, and write data elements to, vector registers of the vector register bank during execution of said sequence of vector instructions, the method comprising the steps of:

responsive to a vector matrix rearrangement instruction specifying the predetermined rearrangement operation to be performed on the data elements in said matrix of storage cells, issuing a set rearrangement enable signal to the vector register bank;

providing a write interface for writing data elements into the vector registers of the vector register bank, the write interface having first and second inputs;

receiving at the first input data elements generated by the vector processing unit during execution of said sequence of vector instructions;

coupling the second input via a data rearrangement path to the matrix of storage cells via which the data elements currently stored in the matrix of storage cells are provided to the write interface in a rearranged form representing the arrangement of data elements that would be obtained by performance of said predetermined rearrangement operation; and when the rearrangement enable signal is set, causing the write interface to perform a write operation to the storage cells of said matrix using the data received at the second input, wherein said write interface comprises, for each storage cell in said matrix, multiplexer circuitry having a first input for receiving a data element generated by the vector processing unit for storage in the associated storage cell, and a second input for receiving via the data rearrangement path a data element currently stored in one of the storage cells of the matrix, said data element received via the data rearrangement path being the data element that needs to be stored in said associated storage cell to represent the outcome of said predetermined rearrangement operation.

15. A computer program product comprising computer readable instructions which when executed on a computer cause the computer to implement a method of performing a predetermined rearrangement operation as claimed in claim 14.

* * * * *